(12) United States Patent
Alstad et al.

(10) Patent No.: US 9,455,864 B2
(45) Date of Patent: Sep. 27, 2016

(54) SYSTEM AND METHOD FOR CREATION, DISTRIBUTION, APPLICATION, AND MANAGEMENT OF SHARED COMPRESSION DICTIONARIES FOR USE IN SYMMETRIC HTTP NETWORKS

(71) Applicant: Radware, Ltd., Tel Aviv (IL)

(72) Inventors: Kent Alstad, Sechelt (CA); Shawn Bissell, North Vancouver (CA); Stephen Meehan, Burnaby (CA); Michael R. Benna, Vancouver (CA)

(73) Assignee: Radware, Ltd., Tel Aviv (IL)

( * ) Notice: Subject to any disclaimer, the term of this patent is extended or adjusted under 35 U.S.C. 154(b) by 326 days.

(21) Appl. No.: 13/926,453

(22) Filed: Jun. 25, 2013

(65) Prior Publication Data
US 2013/0346483 A1 Dec. 26, 2013

Related U.S. Application Data

(60) Provisional application No. 61/663,718, filed on Jun. 25, 2012.

(51) Int. Cl.
*G06F 15/16* (2006.01)
*H04L 29/08* (2006.01)
*H04L 29/06* (2006.01)

(52) U.S. Cl.
CPC .......... *H04L 29/0809* (2013.01); *H04L 69/04* (2013.01)

(58) Field of Classification Search
CPC ... H04L 69/04; H04L 67/02; H04L 67/2828; H04L 69/22; H04L 29/08783; H04L 63/1408; H04L 29/0809; H03M 7/3088; G06F 17/2735
See application file for complete search history.

(56) References Cited

U.S. PATENT DOCUMENTS

| | | | | |
|---|---|---|---|---|
| 4,847,619 A * | 7/1989 | Kato | ................... | H03M 7/3084 341/106 |
| 2011/0202673 A1* | 8/2011 | Vadlakonda | ............ | H04L 69/04 709/231 |
| 2012/0072770 A1* | 3/2012 | Dilman | ............... | G06F 11/0727 714/15 |
| 2013/0268673 A1* | 10/2013 | Graham-Cumming | ........... | H04L 67/2828 709/226 |

OTHER PUBLICATIONS

Butler, Jon et al.; "A Proposal for Shared Dictionary Compression over HTTP"; Sep. 8, 2008; Google, Inc.

* cited by examiner

*Primary Examiner* — Tauqir Hussain
*Assistant Examiner* — Kamran Mohammadi
(74) *Attorney, Agent, or Firm* — M&B IP Analysts, LLC (57) ABSTRACT

A method and system for creating, distributing, and managing of shared compression dictionaries. The system comprises a compressor configured to generate at least one shared compression dictionary based on a context of data streams flow between a client web browser and an origin server; an origin accelerator communicatively connected to the origin server and configured to encode an encountered data stream to a compressed form based on the least one shared compression dictionary; and an edge accelerator communicatively connected to the client web browser and configured to decode the compressed form of the data stream to an uncompressed form using the least one shared compression dictionary.

13 Claims, 5 Drawing Sheets

SYSTEM AND METHOD FOR CREATION, DISTRIBUTION, APPLICATION, AND MANAGEMENT OF SHARED COMPRESSION DICTIONARIES FOR USE IN SYMMETRIC HTTP NETWORKS

CROSS REFERENCE TO RELATED APPLICATIONS

This application claims the benefit of U.S. provisional application No. 61/663,718 filed on Jun. 25, 2012, the contents of which are herein incorporated by reference.

TECHNICAL FIELD

This invention generally relates to accelerating the delivery of HTTP traffic, and more particularly, to a dictionary based compression scheme in over HTTP.

BACKGROUND

In many communications networks, such as the Internet, some message content is repeated in many different messages. One way to increase the efficiency of network communications is to store commonly transmitted data elements at network nodes and to send references to the data elements rather than the full data.

One technique to perform this function is to utilize Shared Dictionary Compression Over HTTP (SDCH), as described in Butler, et al., "A Proposal for Shared Dictionary Compression over HTTP", Sep. 8, 2008 (hereinafter Bulter). Butler does not disclose a compression technique that that leverages cross-payload redundancy.

Typically, when a browser retrieves a set of HTML pages with the same header, footer, inlined JavaScript and cascading style sheets (CSS) requires the retransmission of the same data multiple times. In Bulter, a new data structure "dictionary" that takes advantage of payload redundancy in web-pages is disclosed. A dictionary is a file that contains strings which are likely to appear in subsequent HTTP responses. The dictionary is downloaded by the web browser from the server. In the case described above, if the header, footer, JavaScript, and CSS are stored in a dictionary possessed by both user agent and server, the server can substitute these elements with references to the dictionary, and the user agent (web browser) can reconstruct the original page from these references. By substituting dictionary references for repeated elements in HTTP responses, the payload size can be reduced, thus increasing the efficiency of network communications.

However, as Bulter describes one format of a dictionary (SDCH) and how the SDCH can be decoded and encoded by a server and a user agent, but does not disclose how the dictionaries can be created and maintained, and particularly how a library of shared dictionaries can be created and maintained.

Therefore, it would be advantageous to provide a solution for simple creation, and management of shared compression dictionaries.

SUMMARY

Certain embodiments disclosed herein include a system for creating, distributing, and managing of shared compression dictionaries. The system comprises a compressor configured to generate at least one shared compression dictionary based on a context of data streams flow between a client web browser and an origin server; an origin accelerator communicatively connected to the origin server and configured to encode an encountered data stream to a compressed form based on the least one shared compression dictionary; and an edge accelerator communicatively connected to the client web browser and configured to decode the compressed form of the data stream to an uncompressed form using the least one shared compression dictionary.

Certain embodiments disclosed herein also include a method for shared compression dictionaries, The method comprises recording web-page transitions indicating how users navigate through the web-pages of a web-site; assigning a weight to each of the web-page transition indicating a frequency of the web-page transition; composing flows of web-page transition chains, wherein the web-page transitions having weights above a predefined threshold are included in the composed flows; creating a web-page transition chain hierarchy using the composed flows; traversing the web-page transition chain hierarchy; and generating a plurality of shared compression dictionaries for each of the web-page transition chain detected in the web-page transition chain hierarchy.

Certain embodiments disclosed herein also include an apparatus for creating shared compression dictionaries. The apparatus comprises a queue configured to receive a sampled data stream and a context associated with the sampled data stream; a processor configured to perform a compilation sequence on a pre-configured number of samples, wherein during the compilation sequence, the processor is configured to inspect a sample for common resources detected across the pre-configured number of samples respective of the context of the samples, assign a score to common resources found across the samples, and create at least one shared compression dictionary to include resources having a score above a predefined threshold; and a publisher configured to publish a new version of the least one shared compression dictionary when a compression ratio is greater than a compression ratio of a corresponding previous version.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Various embodiments disclosed herein determine which data is sampled for the creation of the shared dictionaries, how the dictionaries are created, and how the dictionaries are adaptively employed and managed to meet dynamic requirements in light of continual changes to the data that is being transmitted.

In one embodiment, the system and method rely on common protocols and formats. For example, in at least one embodiment, the system and method are optimized for use with the Hypertext Transfer Protocol (HTTP). In another embodiment, the system and method uses a format for SDCH as described in Butler, et al. One skilled in the art will recognize that any suitable protocol and/or format can be used.

In one embodiment, data streams request from clients to origin servers, and responds from the origin servers back to clients, in a manner that significantly reduces the payload of various requests and responses when the data being transmitted is similar to previously sampled traffic.

According to one embodiment, message context is used as the basis for such data reduction. Message context can include, for example, URL segments (such as host, protocol, path, and/or query string); content type; message section (such as header and/or body); response code, and combination therefore. In at least one embodiment, data from HTTP requests and their responses are combined to create a single message context for each pair. The system samples message traffic and sends copies, along with any additional context data, to an offline process where it is inspected and analyzed. Based on this analysis, one or more dictionaries are created, containing content items found to be commonly used for the various message contexts.

The dictionaries created by the offline process are periodically or continuously monitored for effectiveness and rebuilt as data patterns change. Dictionaries are stored and propagated, along with their related contexts, to the various nodes in the system.

In at least one embodiment, dictionaries are created by a sampling processor, referred to herein as a "compressor", which has access to current as well as past samples for all contexts. The compressor compiles dictionaries across contexts and samples. In at least one embodiment, this process is performed on a system that is isolated from live traffic, so as not to adversely impact the performance of the system while the dictionaries are being created. The compressor publishes the dictionaries created for a given context to the origin that will use them for encoding. The origin, in turn, distributes the dictionaries to clients who share the common context and can then decode the common data found in the dictionaries.

In order to create and employ dictionaries most efficiently, the system evaluates, classifies, and tracks the context in which a given data stream exists. The message context is used to determine which dictionary will be most effective for a given context. Before any encoding, decoding, or sampling takes place, the message context is determined so that data in a given stream can be processed.

In at least one embodiment, a network node relatively close to the client, the client edge accelerator node, sends its current dictionary status with the request to a node relatively close to the origin server, the origin accelerator node. The origin accelerator node uses this information to decide which dictionary to use when encoding the response from the origin server. The origin accelerator node may choose to encode using dictionaries already present on the client accelerator node, or it may choose to use a different dictionary (or no dictionary). In the case where the client accelerator node needs to use a decoding dictionary it does not yet have, it obtains that dictionary before decoding commences. In most cases, however, the encoding node will only use a dictionary that the destination decoding node advertises that it already has.

In at least one embodiment, the system packages the data stream into datagrams abstracted from the original protocol. This enables the accelerator to compress all parts of the original message as well as provide a standard context identifier for instructing the decoder as to which dictionaries are required to decode the various segments in the original data envelope. This technique can be used to apply several different dictionaries to the same response data: for example, one dictionary can be applied to the HTTP headers, another to the HTML head section of the document, and yet another to the HTML body section. This technique of using and managing many dictionaries for the fine-grained context in the request or response enables a higher compression ratio without introducing delays in the decoding procedure.

Figure 1:
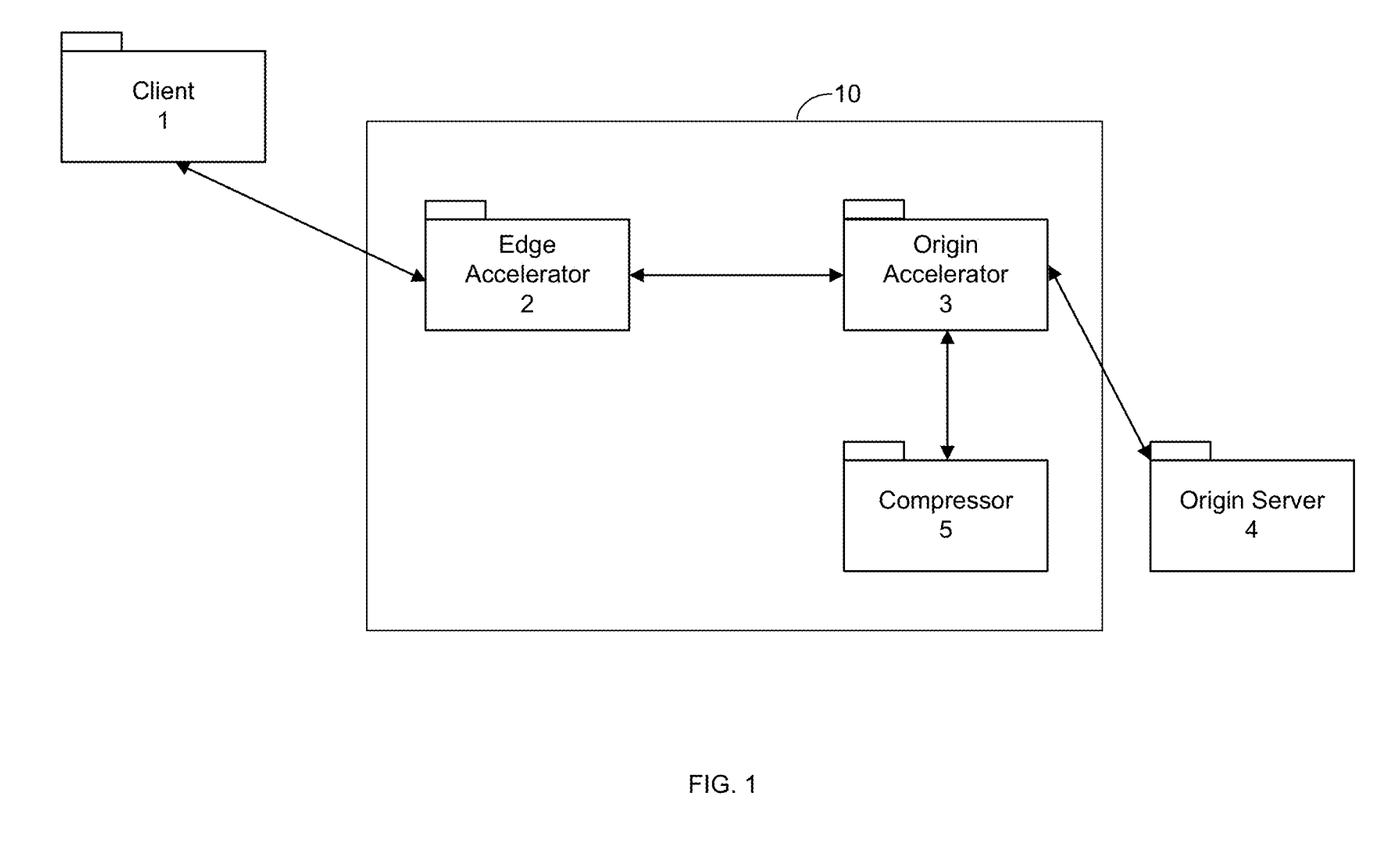
FIG. 1 illustrates a diagram system for creating, distributing, and managing shared compression dictionaries constructed according to one embodiment

FIG. 1 illustrates an exemplary and non-limiting diagram of a system 10 for creating, distributing, and managing shared compression dictionaries constructed according to one embodiment. The system 10 includes an edge accelerator 2, an origin accelerator 3, and a compressor 5. In one embodiment, the system 10 is connected in a network, such as a LAN, a WAN, the Internet, and the like. The system 10 is configured to communicatively connect the web browser 1 and the origin server 4 over the network. The web browser 1 is utilized by the end user to consume the data origins at the server 4 and accelerated by the system 10. In one embodiment, the web browser 1 is configured to contain components for the decoding contents encoded in the dictionary. For example, the Chrome® web browser supports SDCH as part of the browser. Other types of the web browser 101 may include, Internet Explorer®, Safari®, Firefox®, and the like. The origin server 4 typically generates and transmits the original data streams. In an exemplary embodiment, the server 4 is a standard HTTP server that generates and transmits the content requested by the web browser 1.

The edge accelerator 2 is configured to decode, i.e., translate a given data stream from its compressed form back to its original format based on a common shared dictionary. The edge accelerator 2 is also configured to synchronize shared dictionaries with the other components of the system 100. In one embodiment, the edge accelerator 2 may be located in close the network proximity to the client's web browser 1 for performance reasons, but this location is not a functional requirement. In another embodiment, the functionality of the edge accelerator 2 is integrated in the web browser 1 that performs all of the operations necessary to decode the data stream.

The origin accelerator 3 is configured to encode, i.e., translate a given data stream from its (un-encoded) original format to a compressed isomorph based on at least one common dictionary. The origin accelerator 3 is also configured to sample data streams and sending them to the compressor 5. In addition, in one embodiment, the origin accelerator 3 can synchronize shared dictionaries with other components of the system. In one embodiment, the origin accelerator 3 may be deployed close in network proximity to the origin server 4, but this location is not a functional requirement. In at least one embodiment, the accelerator 3 can be located in the same data center as the origin server 4 or may be provisioned in relative proximity to the origin server 4.

In an alternative embodiment, the origin server 4 is also configured to encode the data streams, a function otherwise performed at the origin accelerator 3. In such an embodiment, the encoded data stream is compressed between origin server 4 and origin accelerator 3 ("first mile") as well as between the origin accelerator 3 and the edge accelerator 2 (the "middle mile"), and potentially between the edge accelerator 2 and the client 1 (the "last mile").

In one embodiment, in the event that the origin accelerator 3 encounters already-encoded data that must be sampled, it performs an off-line decoding process prior to sending the sample to the compressor 5. In another embodiment, the sampling components can be deployed at the origin server 4, such that the sampling takes place before encoding, and the data stream does not need to be decoded prior to sending the sample to the compressor 5.

According to the disclosed embodiments, the compressor 5 is configured to analyze current and past samples for all contexts. In at least one embodiment, the compressor 5 creates dictionaries and publishes them to the edge and origin accelerators 2 and 3.

It should be noted that FIG. 1 shows one client web browser and one origin server merely for the sake of simplicity of the description. In a typical deployment of the system 10, a plurality of servers and clients's browsers can be supported.

Figure 2:
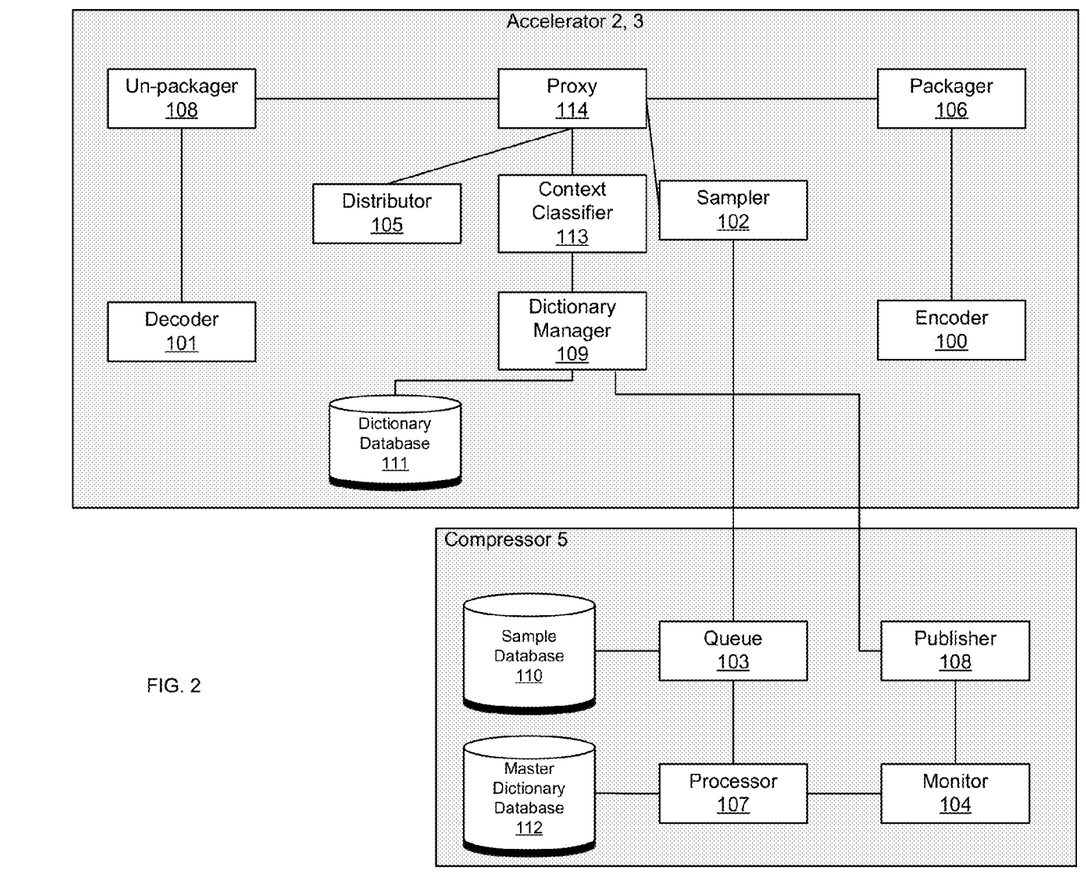
FIG. 2 is a block diagram illustrating in further detail components of the system of FIG. 1 according to various embodiments.

FIG. 2 is an exemplary and non-limiting block diagram illustrating in further detail components of the system 10 according to various embodiments. The encoder 100 uses a dictionary, stored in a dictionary database 111, to transform a given data stream from its original form to a compressed form in which all of the data elements found in the dictionary are removed from the original stream and replaced with dictionary entry references. In one embodiment, the context classifier 113 makes a determination as to which dictionary to use for the encoding procedure, and passes this determination to the encoder 100 as an input to the encoding process.

The decoder 101, operable in the edge accelerator 2, is configured to use a dictionary to transform a given data stream from its compressed form back to its original form. In the original form of the data, all the dictionary references found in the compressed data are replaced with the original entries found in the dictionary. A determination is made as to which dictionary to use for a decoding procedure carried out by the decoder 101. In one embodiment, this is performed as follows: when creating packages, the packager 106 tags each encoded datagram with the identifier of the dictionary used for encoding. This identifier is used during decoding to obtain a reference to the correct dictionary required for decoding.

The sampler 102 receives information from a queue 103, included in the compressor 5, about which message contexts are of interest and need to be sampled. The sampler 102 then decodes the data if it is encoded, tags it with the message context metadata, and forwards it to the queue 103 for further processing. In some cases, when the queue 103 and the sampler 102 are on different networks with a slow connection, the samples are not decoded until they are on the same system as the queue 103. This is performed to minimize the size of sample data payload.

The queue 103 is also configured to categorize and store samples for use by the processor 107. The queue 103 manages a historical record of some or all samples and tracks which samples are used as input for various dictionaries and message contexts. In one embodiment, the data maintained by the queue 103 is persistent and is only flushed upon a manual command or in response to a low storage space condition. In one embodiment, the queue 103 component is responsible for managing the sample history and removing old samples only when they are no longer needed or given an explicit system administrator command.

The monitor 104, also operable in the compressor 5, is also configured to evaluate the effectiveness of each dictionary for each message context. In one embodiment, the monitor 104 runs periodically (e.g., every 5 minutes), encoding recent samples and then measuring the compression ratio. Both published and unpublished dictionaries are iteratively tested against a sliding window of the most recent samples for each message context. When the effectiveness of a published dictionary falls below a predefined "minimum compression ratio" threshold (which may be user-configured), that dictionary is no longer used (i.e., it is unpublished via the publisher 108). When an unpublished dictionary effectiveness is found to be greater than a predefined "new publication compression threshold," it is flagged for publication and the publisher 108 manages its distribution such that it seamlessly supersedes any previously published dictionary for the given message context.

The distributor 105, included in the edge accelerator 2, receives publication notifications from the publisher 108 and fetches new dictionaries from the publisher 108 via the master dictionary database 112. In at least one embodiment, the distributor 105 can also be configured to implement an unpublished instruction. In this embodiment, the distributor 115 removes existing dictionaries from the local dictionary database 111 under the control of the dictionary manager 109. Once published or unpublished, the new dictionary state is advertised for a given message context.

Each message context has a set of versioned dictionaries, with newer versions superseding older versions. When the edge accelerator 2 encounters a message context for which it has an existing dictionary, it tags the request with the message context identifier as well as the version identifier of the dictionary that it possesses. In one embodiment, when the encoder 100, in the edge accelerator 3, prepares to encode the response, it first checks the status of the receiving decoder's 101 dictionary version and encodes with a dictionary that is known to already exist at the decoder 101. In the event that a new version of the dictionary for the given context is available, the dictionary manager 109 is instructed to coordinate the distribution, via the distributor 105 component, of the newer dictionary to the decoder node for use in decoding future messages.

In another embodiment, the encoder 100 is configured to encode the data with the latest most effective dictionary and instructs the distributor 105 to send the latest dictionary separately from the transmission of the encoded data message. When the data with the newer encoding is received at the decoder 101, the decoder 101 is configured to block the message until the required dictionary is received and then decodes the data using the new dictionary when it is available.

In one embodiment, the packager 106 is configured to frame existing HTTP requests into envelopes on top of an existing IP network protocol, such as HTTP, TCP, or UDP.

Essentially this is a wrapper around the original message that re-packages the original messages into optimally sized packages that are tagged with dictionary identifiers. The advantage of this abstraction is that it enables all parts of the original message to be encoded (e.g., including all HTTP headers) as well as enabling multiple dictionary references to be included, along with instructions as to which sections of the package they should be used to decode. This packing and unpacking step is not essential. The system can function without it, but in an embodiment that does not include the packaging step, the headers (or control fields) of the original protocol are not encoded.

The processor 107, included in the compressor 5, is configured to create dictionaries for each message context. In one embodiment, the processor 107 is configured to fetch, from the queue 103, samples related to the context and inspecting them for common data. In one embodiment, the processor 107 is implemented as a statistical multi-pass system which tracks the repeat occurrences of the largest common sequential data structure across samples found for the same message context. These repeated data structures are stored in a versioned data dictionary, and all instances of all dictionaries are stored by their respective unique identifiers in the master dictionary database 112. In another embodiment, older versions of dictionaries can be assigned an expiration policy.

A un-packager component 108, in the edge accelerator 102, performs the reverse operation of the packager 106. Each of the abstract packages or frames is unwrapped and sent to the decoder 101, where it is transformed back to its original form so that it can be forwarded on to the next node by the proxy 110 using the original protocol and packetization structure. The un-packaging step is optional and is, in general, only performed when packaging is also performed.

The dictionary manager 109 is used by the encoder 100 and decoder 101 to fetch dictionary references based on the message context determined by a context classifier 113. The sample database 110 is configured to enable the storage and retrieval storing and retrieving samples based on their respective message context identifiers and time frames. The queue 103 also stores samples in the sample database 110 and the processor 107 retrieves and uses them when creating dictionaries.

As noted above, the dictionary database 111 is used locally by the edge and origin accelerators 2 and 3 to store a subset of the dictionaries found in the master dictionary database 112. In at least one embodiment, the subset of dictionaries includes only those that have been encountered and are known to be required by a given node. In at least one embodiment, dictionaries that contain references that are common across many message contexts can be pushed to the accelerator 2 or 3 as they are very likely to be encountered.

The master dictionary database 112 is a persistent data storage used by the processor 107, monitor 104, and publisher 108 to facilitate the storage and retrieval of all the dictionaries and all versions of these dictionaries for all message contexts. In one embodiment, the dictionary is only purged based on administrative user intervention or when it is no longer used and limited storage space does not permit its retention. In at least one embodiment, an expiration policy can be assigned to the dictionaries.

The context classifier 113 is configured to by the proxy 114 to determine the message context for each HTTP request-response pair. In one embodiment, this classification is based at least one of the following parameters: URL segments (i.e., host, protocol type, path, and query string), content type, message section (i.e., header, body), and response code. It should be noted that this list is merely exemplary and other fields can be used if they are relevant to defining significant differences in the message contexts.

In one embodiment, a proxy 114 is configured to receive and forward HTTP requests and responses between nodes. As data is transmitted, the proxy coordinates the various system components so as to orchestrate the encoding and decoding of the data in a manner that is transparent to components that are outside of the system. The web browser or server 4 need not have any knowledge that this system is being used to intercept and accelerate traffic between nodes.

Figure 3:
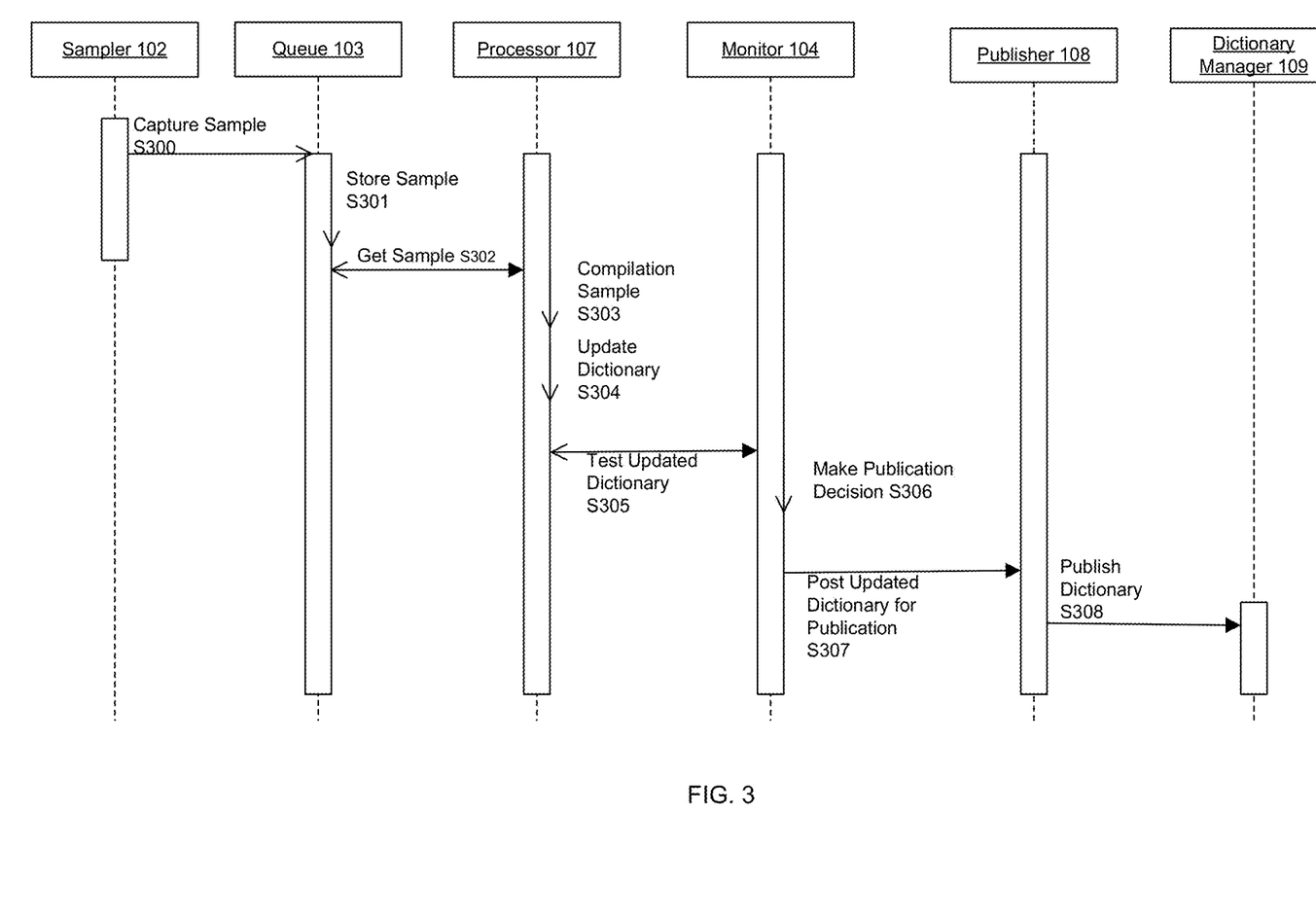
FIG. 3 is a sequence diagram illustrating a method for creating the compression dictionaries according to one embodiment.

FIG. 3 is an exemplary and non-limiting sequence diagram illustrating a method for creating the compression dictionaries used by the system 10 according to one embodiment. The method can be performed by the compressor 5 depicted in FIG. 2.

In S300, a request/response pair that has been classified, assigned with a message context identifier, and tagged with classification information is received at the queue. As shown in FIG. 3, such information is sent from the sampler 102.

In S301, the queue 103 stores the sample with the assigned context identifier in the sample database 110. In S302, a sample for a given message context identifier is fetched and added to the compilation sequence.

In S303, during the compilation, the processor 107 is configured to inspect a sample for common sequences within each resource that is found across samples for the given context. To completely compose a dictionary, some or all of the samples related to a given message context for the most recent sliding time window are read and inspected. The processor 107 is further configured to assign a score all of the common sequences found across the samples and includes the highest value items (longest, most commonly occurring sequences) in the dictionary. In at least one embodiment, the value threshold for including a given sequence (within a resource) in the dictionary is determined by a configuration setting controlled by the system administrator user based on the storage available on each of the acceleration nodes and the speed and bandwidth available to the system when sharing the dictionaries.

In step 304, a new version of the dictionary resulting from the latest compiled sequence is added to the master dictionary database 112. In S305, the monitor 104 tests the compression ratio of the updated dictionary by using it to encode a set of recently added samples. The compression ratio of the updated dictionary is stored with the dictionary for future use. In one embodiment, a VCDIFF algorithm (described in RFC 3284) is used for the compression.

In S306, the compression ratio of the dictionary is compared with the ratio of the previous version. If there is not a significant improvement of the compression ratio, the dictionary is discarded and not used. The improvement in the compression ratio to be considered a significant improvement is a pre-configured value set, for example, by the configuration setting created by the system administrator. In an exemplary embodiment, a significant improvement may be at least 10% of ratio improvement. If there is a significant improvement of the compression ratio, then the dictionary is flagged for publication. The created dictionary may be an SDCH format and the like.

In S307, the dictionary record in the master dictionary database 112 is flagged for publication. In S308, the dictionary manager 109 is informed that a new version of the dictionary is available for a given message context. In one embodiment, S308 is performed by the publisher 108. The updated dictionary is in turn retrieved from the master dictionary database 112 by the distributor 105 for distribution to any given origin accelerator 3 on an as-needed basis.

Figure 4:
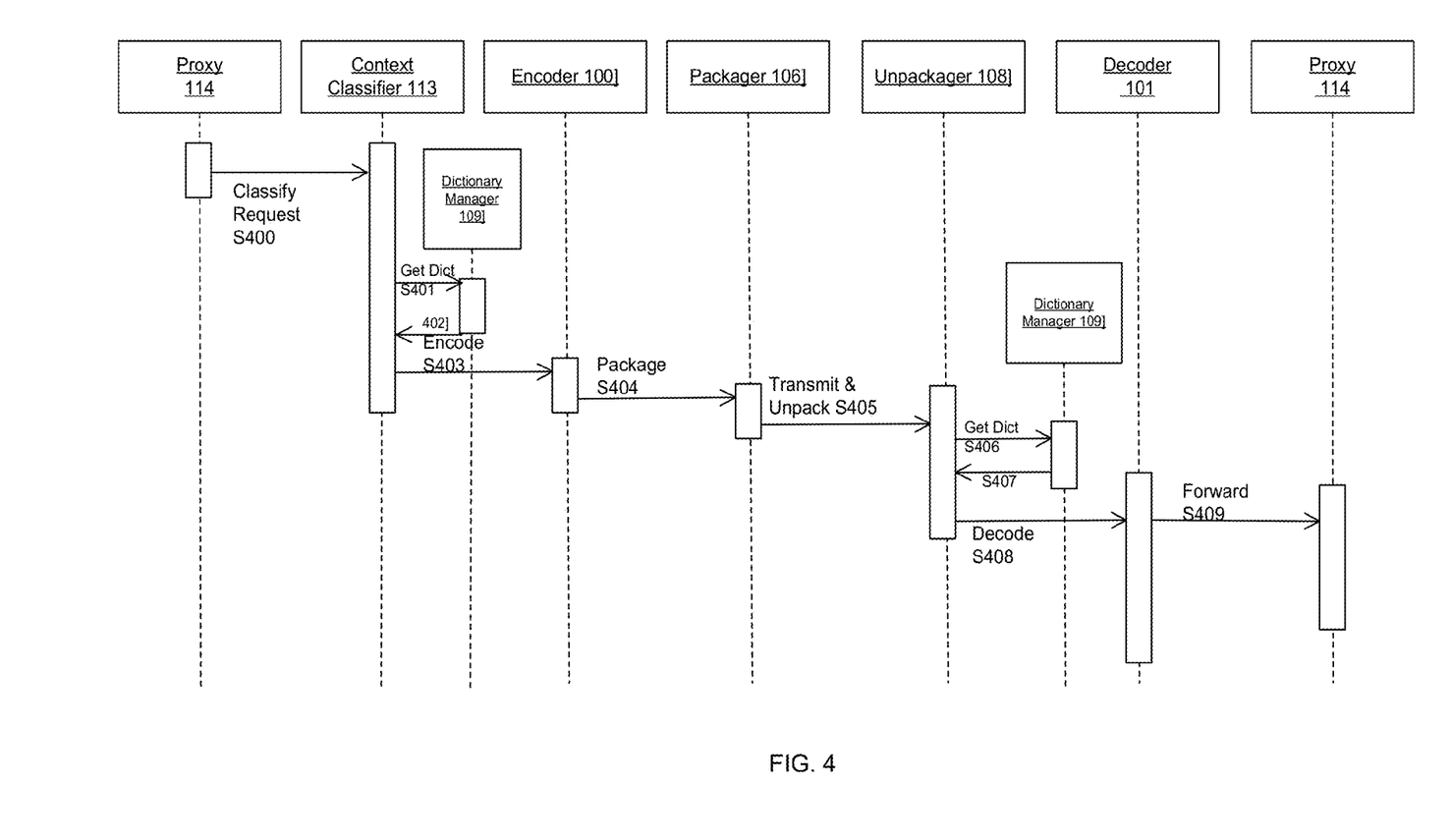
FIG. 4 is a sequence diagram illustrating a method for compressing a data stream for an established message context using an already prepared dictionary according to one embodiment.

FIG. 4 is an exemplary and non-limiting sequence diagram illustrating a method for compressing a data stream for an established message context using an already prepared dictionary according to one embodiment. For illustrative purposes, the diagram in FIG. 4 illustrates the encoding taking place on the origin accelerator 3 and the decoding taking place on the edge accelerator 2. One skilled in the art should recognize that this can be reversed where appropriate.

In S400, the proxy 114, operable in the origin accelerator 3, is configured to instruct the context classifier 113 to classify and assign a message context identifier to each encountered request. An encountered request may be a HTTP request sent from the client browser 1 to the origin server 4.

In S401 the context classifier 113 is configured to request, from the dictionary manager 109, a reference to an existing dictionary given the message context identifier. In the event that the dictionary is not found, the dictionary manager 109 notifies the distributor 105 that the need for the requested dictionary has been detected by the origin accelerator 3. This initiates an asynchronous process that pulls the dictionary to the accelerator 3, so that it is available for subsequent requests.

In S402, the dictionary reference associated with the message context identifier is returned to the context classifier 113. The dictionary can be used during the encoding process. Using the dictionary reference provided in S402, the encoder 100 is configured to encode or transform the original data stream into its compressed isomorph (S403). In an embodiment, the encoding step includes reconstructing the data stream using contents of the dictionary provided in S402. As an example, once a set of shared compression dictionaries have been flagged for production, the proxy 114 is configured to execute a new "shared dictionary evaluation" process for each request. During this evaluation, requests are classified, and then based on the data found in the X-SharedDictionariesheader, a best-fit set of required dictionaries is calculated. The X-SharedDictionaries header contains a list of dictionaries know to already exist on the client. Using the output of the "shared dictionary evaluation" the proxy 114 asynchronously responds with the set of ordered compression dictionaries, as required by the client. In the event the set of shared compression dictionaries is not available natively on the client device, the proxy 114 is configured to inject scripts (e.g., JavaScript) to perform the dictionary management and encoding.

In S404, the encoded message is wrapped into packages by the packager 106 in the origin accelerator 2. Each package is tagged with message context identifiers indicating which dictionary is to be used for decoding. In S405, the compressed message is sent to the destination edge accelerator 2, where it is directed to the unpackager 108 for unpackaging.

Once the encoded of data message is completed, a decoding process can be performed by the edge accelerator 2. Specifically, the encoded data message is being been unpackaged by the un-packager 108 included in the edge accelerator 2. Then, in S406, a get DICT process is performed, in which the unpackager 106 is configured to request, from the dictionary manager 109, a reference to the dictionary required for decoding.

In S407, the dictionary reference associated with the message context identifier is returned to the un-packager 108, which provides it to the decoder 101. In S408, the decoder 101 is configured to use the dictionary supplied in S407 to transform the encoded data stream back to its original format. In one embodiment, the decoding includes reconstructing the original data stream using contents of the supplied dictionary. As an example to decode using the generated shared compression dictionaries, the client browser is configured to insert the list of existing dictionaries into each HTML request using the X-SharedDictionaries header. This allows the client to decode the HTML response the correctly mapped shared compression dictionary. In the event that shared dictionary compression is not available, the client browser is configured to runs the injected script (e.g. JavaScript) to perform the dictionary management and decoding. In the S409, the decoded (i.e., original) data is forwarded by the proxy 114, in the edge accelerator 2, to destination node.

Figure 5:
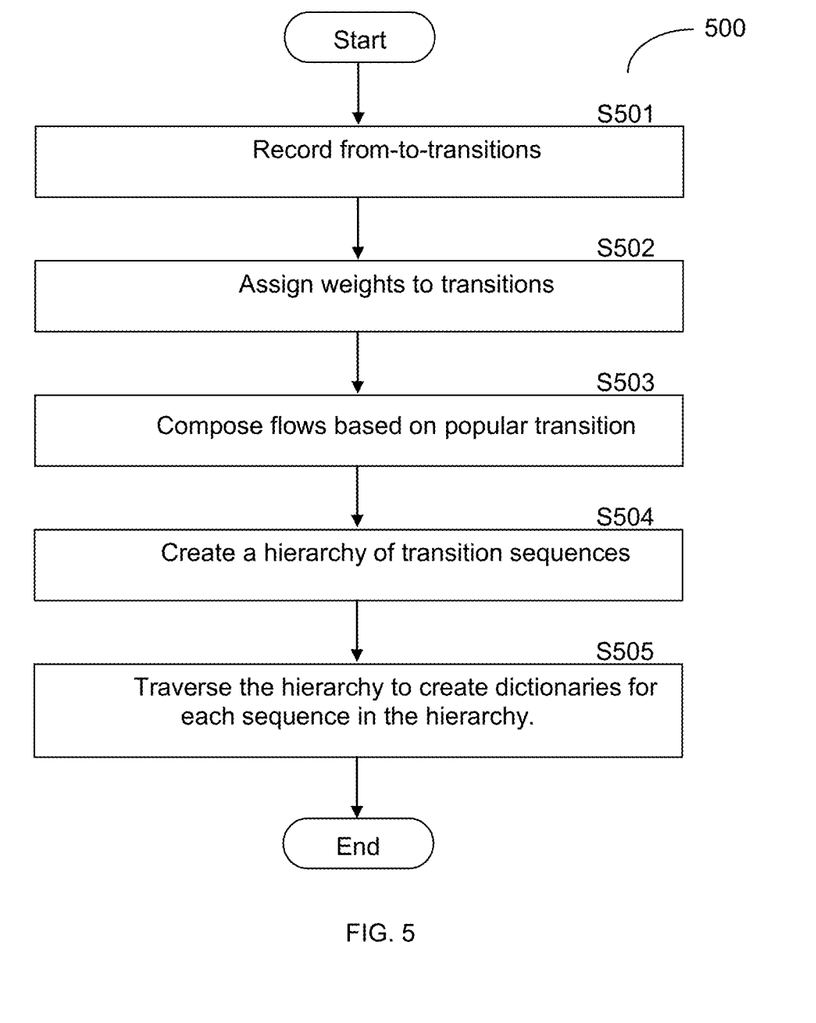
FIG. 5 is a non-limiting flowchart illustrating a method for creating the compression dictionaries according to another embodiment.

FIG. 5 shows an exemplary and non-limiting flowchart 500 illustrating a method for creating shared compression dictionaries according to another embodiment. The dictionaries include resources and HTML fragments. For example, the resources can either be in the form of entire HTTP response bodies in binary or base64 encoded for consolidation into the HTML. As noted above, dictionaries are created to address distinct types of resources including, for example, HTML and all of the embedded resources and subordinate MIME types, e.g., CSS, JavaScript, images, Flash files, video clips. A multi-pass process is used to isolate repeated byte sequences within each resource and added to the dictionary. Once all repeated sequences have been added then the remaining unique sequences are then encoded into the dictionary.

According to this embodiment, a series of dictionaries are created and deployed based on the user's context in the site. As the user moves from one page to another, the dictionary is most likely required to be transferred.

In S501, from-to page transitions are recorded. Such transitions refer to how users navigate through web-pages of a web site (hosted for example in the origin server 4). The number of minimum recoded transitions is preconfigured. In S502, weights (or other counts measured) are assigned to how frequently users transition between pages.

In S503, flows based on the most popular transition chains that meet at least one preconfigured threshold are composed. A preconfigured threshold is compared against the weights assigned to a certain transition.

In S504, a hierarchy of transition chains from the composed flows is created. As an example, when the user navigates from a web page www.xyx.com/a to www.xyx.com/b, then such a chain will be included in the composed flow. In one embodiment, transition chains that are likely to be encountered within a given user session are added to the hierarchy, where chains that are encountered first are placed in nodes close to the top of the hierarchy.

In S505, the transition chain hierarchy is traversed from the root to the leaves, and at least two shared compression dictionaries are created for each chain in the hierarchy. One dictionary is for an HTML page and another dictionary is to encode embedded/subordinate resources. As the transition chain hierarchy is traversed, only new data not found in previous nodes are added to subordinate embedded/dictionaries. In one embodiment, S505 is performed by the compressor 5.

In one embodiment, the created dictionaries are rebuilt to include common resources, including fragments of HTML pages, used on multiple pages on a site using multiple users. With this aim, periodically all resources that have been found not to be common across user sessions are removed from the dictionary. In an exemplary embodiment, each resource in the dictionary is assigned with a rank identifying the frequency that the element was encountered in the response stream. According to this embodiment, the dictionary metadata related to each entry contains, for example, the data that is common across users of the pages and resources.

In another embodiment, a manifest file is utilized to designate resources and/or HTLM pages that should be included in the chain hierarchy, thus resources that should be eventually encoded in the dictionary. The manifest file may be, but is not limited to, an XML file. The manifest is uploaded to the compressor 5 which places the manifest as a root of the chain hierarchy and processed as discussed above.

In an exemplary embodiment, when using a manifest, a set of known common pages and individual resources are specified in a file (e.g., a xml document) for direct inclusion in the sites' shared dictionaries. The manifest is read on startup or periodically during operation. The entries in the manifest serve as a special set of "application manifest" directives describing how the resource are to be placed and used in the resulting shared compression dictionaries.

A unique set of dictionaries is created for each client group (mobile, tablet, Desktop, etc.) governed by set client limitation configuration options. The resulting data is then put into the dictionary database 111 based on "first sight" of the proxy 114 encountering the specified resource or HTML page. Each captured sample (e.g., HTML, CSS, JS, IMG, etc.) is added directly to the dictionary with all common parts of the data added to the dictionary content. The remaining unique bytes in the data are encoded and stored in the dictionary database 111 for use during the output dictionary compilation phase.

According to one embodiment, the creation of the dictionaries is created in a way that they can be utilized by the client browsers. Each such dictionary targets a flow site and has a limited pre-configured size. The created dictionaries are loaded and saved in the client web browser. The client-side dictionaries can be supported by modern web-browser (e.g., Chrome®) or by using a proprietary script that is included with and executed as part of the page rendering logic. An example, during output publication, the dictionaries are split into smaller inter-dependent files. When publishing, the proxy 114 is configured to create metadata about each dictionary including dependencies. When one dictionary depends on another, the proxy 114 includes information about the prerequisites that will be sent to the client before a current requested dictionary.

In another embodiment, dictionaries without size constraints are generated to contain all common resources. A dictionary with all resources found on a predefined number of unique URLs is included, created, and compared to previously created dictionaries. When a new dictionary reaches a compression threshold that provides a better compression than the previous version dictionary. In a practical embodiment, the dictionaries' creation and compression, and decompression operations can take place on at least two intermediate proxies in the network for the purposes of reducing the traffic payload over the "middle-mile" of the network.

Following is a non-limiting example for the operation of the techniques for creating the shared compression dictionaries disclosed herein. In a typical scenario, the disclosed techniques can be used to accelerate a public facing e-commerce site. The system (10) performed in part the disclosed techniques is deployed be inserted into the traffic stream upstream from the Web Server (nearer the client). In a common interaction, users are discovered the on-site through 'landing pages' linked from search results (e.g., search for flights on a search engine). Once on the site, the typical user may browse through various product pages and then possibly the buy a good or service.

To capture from-to transition count, once enabled the proxy 114 classifies all URL page requests via the context classifier 113. Using a referrer in a request header, the proxy 114 keeps a count of user page transitions (to and from) as well as a reference to the previous transition so that the transitions can be formed into chains (i.e., at least 2 pages). The transition chains enable the dictionary manager 109 to count the number of times users navigates through a certain chain of pages in the web site. These counts are periodically pushed to the dictionary database 111 via the dictionary manager 109 for later use when constructing the transition chain hierarchy.

In addition to capturing page transition data, the proxy 114 is also configured to capture or sample, real user responses (e.g., HTML, CSS, JS, IMG, etc.) as they travel through the proxy (or the system 10). Samples are captured based on a classification key and only pages from unique user sessions are sampled (i.e., across user sessions) up to a sample threshold. Data from sampled (or captured) responses are added to the compressors 5 and the queue 103. Then, the processor 107 identifies common elements (and sequences) found in each resource, creates dictionary entries, and related dictionary encoding required by the dictionary database 111 for use during the output compilation phase (e.g., S303, FIG. 3). Depending on the configuration, one or more encoding and dictionary metadata elements are created during the sample processing procedures that are performed by the processor 107. The various options are as discussed above.

At the start of the publishing stage, the dictionary manager 109 is configured to create a hierarchical tree populated with classification key sequences, referred to as a "site flow tree." This tree is composed of a hierarchy of nodes with each node representing a unique classification key. Each inter-node relationship is given a weight based on the page transition count data gathered by the proxy 114. Transitions and flows with higher user transition counts are more popular and thus more valuable to shared compression dictionaries and thus are placed nearer the root. Once the classification hierarchy has been created based on real user page transition data, the manual classification keys specified by the "Application Manifest" method are optionally prepended to the root node of the hierarchy.

Once the site flow tree is available, the dictionaries can be published. During this phase a series of inter-dependent output shared compression dictionaries is created for each targeted client platform (e.g., chrome mobile, chrome desktop). The publisher 108 uses the master dictionary database 112 that has compression data by classification key (i.e., highly granular data) and assembles client tailored shared dictionaries, sized appropriately for the targeted client. These dictionaries are stored and used on a per site basis.

The foregoing detailed description has set forth a few of the many forms that the invention can take. It is intended that the foregoing detailed description be understood as an illustration of selected forms that the invention can take and not as a limitation to the definition of the invention.

Most preferably, the various embodiments of the invention can be implemented as any combination of hardware, firmware, and software. Moreover, the software is preferably implemented as an application program tangibly embodied on a program storage unit or computer readable medium.

The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A system for creating, distributing, and managing of shared compression dictionaries, comprising:
   a compressor configured to generate at least one shared compression dictionary based on a context of data streams flow between a client web browser and an origin server, wherein the context being derived from data streams is of at least one request and a corresponding response between the client web browser and the origin server;
   an origin accelerator communicatively connected to the origin server and configured to encode an encountered data stream to a compressed form based on the at least one shared compression dictionary;
   an edge accelerator communicatively connected to the client web browser and configured to decode the compressed form of the data stream to an uncompressed form using the at least one shared compression dictionary; and
   a dictionary database accessible to each of the edge accelerator, the origin accelerator and the compressor, wherein the compressor is configured to generate and save the at least one shared compression dictionary in the dictionary database developed as part of an offline process.

2. The system of claim 1, wherein the origin accelerator is further configured to:
   sample the data streams;
   determine a context for each of the sampled data streams; and
   provide the sampled data streams and their determined context to the compressor.

3. The system of claim 1, wherein each of the origin accelerator and the edge accelerator is configured to select the at least one shared compression dictionary based on a context of the encountered data stream.

4. The system of claim 3, wherein the origin accelerator is configured to encode the encountered data stream by replacing common resources that appear in the encountered data stream with a reference to the at least one shared compression dictionary.

5. The system of claim 3, wherein the edge accelerator is configured to decode the encountered data stream by reconstructing the encountered data stream using contents of the at least one shared compression dictionary.

6. The system of claim 5, wherein the encountered data stream is at least a web page, wherein the common resources include at least one of: a HTML header, a HTLM footer, a HTML fragments, JavaScript, cascading style sheets (CSS), flash files, video clips.

7. The system of claim 6, wherein the context of encountered data stream is based on at least one of: a URL segment, a content type, a message section, and a response code.

8. The system of claim 1, wherein the compressor comprises:
   a sample database;
   a queue configured to receive a sampled data stream and a context associated with the sampled data stream, wherein the queue is further configured to save the data stream samples in the sample database; and
   a master dictionary database configured to store the at least one shared compression dictionary;
   a processor configured to perform a compilation sequence process on a pre-configured number of samples stored in the sample database, wherein when performing the compilation sequence process, the processor is configured to inspect the samples for common resources found across the pre-configured number of samples respective of the context of the samples, assign a score to common resources found across the samples, and generate the shared compression dictionary by placing therein resources having a score above a predefined threshold; and
   the processor is further configured to act as a publisher that publishes a new version of the least one shared compression dictionary when the compression ratio of the new version of the least one shared compression dictionary is greater than a compression ratio of a corresponding previous version of the least one shared compression dictionary.

9. The system of claim 1, wherein the communication between the client web browser and the origin server is performed using a hypertext transfer protocol (HTTP).

10. The system of claim 9, wherein the edge accelerator is deployed in any one of: a close network proximity to the client web browser and in the client web browser, wherein the origin accelerator is deployed in any one of: a close network proximity to the origin server and in the origin server.

11. An apparatus for creating shared compression dictionaries, comprising:
   a dictionary database;
   at least one processor; and
   a memory, coupled to the at least one processor, wherein the memory contains instructions that, when executed by the at least one processor, configure the apparatus to:
   receive a sampled data stream and a context associated with the sampled data stream, the context being derived from the sampled data stream is of at least one request and a corresponding response;
   perform a compilation sequence process on a pre-configured number of samples;
   inspect a sample for common resources detected across the pre-configured number of samples respective of the context of the samples;
   assign a score to common resources found across the samples;
   create at least one shared compression dictionary to include resources having a score above a predefined threshold;
   publish a new version of the least one shared compression dictionary when a compression ratio of the new version of the at least one shared compression dictionary is greater than a compression ratio of a corresponding previous version of the compression dictionary; and store in the a dictionary database the at least one shared compression dictionary developed as part of an offline process.

12. The apparatus of claim 11, further comprising:

a sample database, wherein the at least one processor is further configured to store samples of data streams and their associated context.

13. The apparatus of claim 11, wherein the data stream is at least a web page, wherein the common resources include at least one of: a HTML header, a HTLM footer, HTML fragments, JavaScript, cascading style sheets (CSS), flash files, video clips.

\* \* \* \* \*